United States Patent
Chandramouli et al.

(10) Patent No.: US 10,952,177 B2
(45) Date of Patent: Mar. 16, 2021

(54) DYNAMIC SUBSCRIPTION HANDLING IN 5G AND LONG TERM EVOLUTION (LTE)

(71) Applicant: NOKIA SOLUTIONS AND NETWORKS OY, Espoo (FI)

(72) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/339,911

(22) PCT Filed: Oct. 10, 2016

(86) PCT No.: PCT/US2016/056257
§ 371 (c)(1),
(2) Date: Apr. 5, 2019

(87) PCT Pub. No.: WO2018/070981
PCT Pub. Date: Apr. 19, 2018

(65) Prior Publication Data
US 2020/0053685 A1 Feb. 13, 2020

(51) Int. Cl.
*H04W 4/00* (2018.01)
*H04W 60/04* (2009.01)
(Continued)

(52) U.S. Cl.
CPC ............. *H04W 60/04* (2013.01); *H04W 8/20* (2013.01); *H04W 12/0608* (2019.01); *H04W 48/02* (2013.01)

(58) Field of Classification Search
CPC ... H04W 60/04; H04W 12/0608; H04W 8/20; H04W 48/02
(Continued)

(56) References Cited

U.S. PATENT DOCUMENTS

| 2012/0077496 A1 | 3/2012 | Mathias et al. |
| 2014/0007200 A1 | 1/2014 | Zisimopoulos et al. |

(Continued)

FOREIGN PATENT DOCUMENTS

WO    2016012034 A1    1/2016

OTHER PUBLICATIONS

International Search Report & Written Opinion dated Jan. 26, 2017 corresponding to International Patent Application No. PCT/US2016/056257.

(Continued)

*Primary Examiner* — Thai D Hoang
(74) *Attorney, Agent, or Firm* — Squire Patton Boggs (US) LLP (57) ABSTRACT

Systems, methods, apparatuses, and computer program products for dynamic subscription handling are provided. One method includes receiving, by a control node in a network, a request in which a user equipment requests to register with the network or requests to obtain a specific service for a certain access point name. The method may then include determining whether the user equipment is authorized to obtain services from the network or authorized to use the access point name. When it is determined that the user equipment is not authorized to obtain services from the network or not authorized to use the access point name, the method includes re-directing the user equipment to a subscription server, sending a response to the user equipment indicating that the request is rejected with re-direction, and triggering establishment of a packet data connectivity session for the user equipment.

20 Claims, 5 Drawing Sheets

(51) Int. Cl.
*H04W 12/06* (2021.01)
*H04W 8/20* (2009.01)
*H04W 48/02* (2009.01)

(58) Field of Classification Search
USPC .............. 370/329–330, 335–345, 347–348
See application file for complete search history.

(56) References Cited

U.S. PATENT DOCUMENTS

| | | | |
|---|---|---|---|
| 2014/0245395 A1* | 8/2014 | Hulse .................. | H04L 63/101 |
| | | | 726/4 |
| 2015/0127565 A1* | 5/2015 | Chevalier ............. | G06Q 30/00 |
| | | | 705/319 |
| 2015/0281466 A1 | 10/2015 | Guo et al. | |
| 2016/0028665 A1 | 1/2016 | Yan et al. | |
| 2016/0261754 A1* | 9/2016 | Keller .................. | H04M 15/61 |

OTHER PUBLICATIONS

Mar. 26, 2020 Extended Search Report issued in European Patent Application No. 16918910.7.

* cited by examiner

DYNAMIC SUBSCRIPTION HANDLING IN 5G AND LONG TERM EVOLUTION (LTE)

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to dynamic subscription handling for establishing access, for example, to 5G and LTE/LTE-A systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. Narrowband IoT-LTE (NB-IoT) is envisioned to operate on 180/200 kHz channel. The deployment of NB-IoT may be in-band LTE, a guard band to LTE, UMTS or other system as well as stand-alone on a specific carrier.

SUMMARY

One embodiment is directed to a method, which may include receiving, by a control node in a network, a request from a user equipment, where the request comprises a request for the user equipment to register with the network or a request to obtain a specific service for a certain access point name. The method may also include determining whether the user equipment is authorized to obtain services from the network or authorized to use the access point name, and when it is determined that the user equipment is not authorized to obtain services from the network or not authorized to use the access point name, re-directing the user equipment to a subscription server, sending a response to the user equipment indicating that the request is rejected with re-direction, and triggering establishment of a packet data connectivity session for the user equipment, wherein when a packet is received, from the user equipment, that is destined for any destination within the network, the packet is re-directed to the subscription server via the packet data connectivity session.

Another embodiment is directed to an apparatus, which may include receiving means for receiving a request from a user equipment, where the request comprises a request for the user equipment to register with a network or a request to obtain a specific service for a certain access point name. The apparatus may also include determining means for determining whether the user equipment is authorized to obtain services from the network or authorized to use the access point name, and when it is determined that the user equipment is not authorized to obtain services from the network or not authorized to use the access point name, re-directing means for re-directing the user equipment to a subscription server, sending means for sending a response to the user equipment indicating that the request is rejected with re-direction, and triggering means for triggering establishment of a packet data connectivity session for the user equipment, wherein when a packet is received, from the user equipment, that is destined for any destination within the network, the packet is re-directed to the subscription server via the packet data connectivity session.

Another embodiment is directed to an apparatus that may include at least one processor and at least one memory including computer program code. The at least one memory and computer program code are configured, with the at least one processor, to cause the apparatus at least to receive a request from a user equipment, where the request comprises a request for the user equipment to register with a network or a request to obtain a specific service for a certain access point name, to determine whether the user equipment is authorized to obtain services from the network or authorized to use the access point name, and when it is determined that the user equipment is not authorized to obtain services from the network or not authorized to use the access point name, to re-direct the user equipment to a subscription server, to send a response to the user equipment indicating that the request is rejected with re-direction, and to trigger establishment of a packet data connectivity session for the user equipment, wherein when a packet is received, from the user equipment, that is destined for any destination within the network, the packet is re-directed to the subscription server via the packet data connectivity session.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for dynamic subscription handling, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
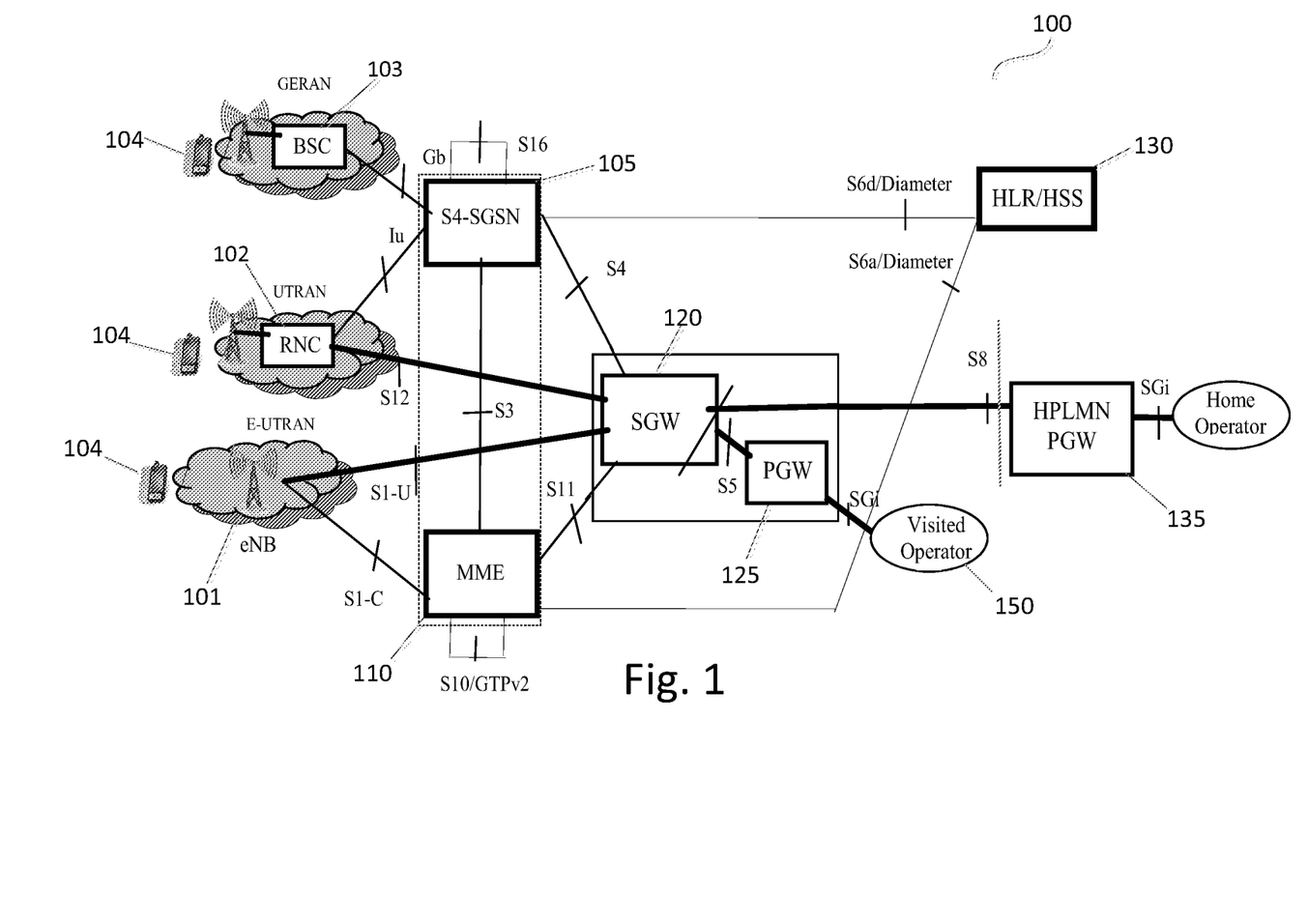
FIG. 1 illustrates an example of an evolved packet system.

The evolved packet system (EPS), which may also be referred to as the long term evolution (LTE) network, is the evolution of the general packet radio system (GPRS). EPS provides a new radio interface and new evolved packet core (EPC) network functions for broadband wireless data access. FIG. 1 illustrates an example of the EPS core network 100, according to an embodiment. As illustrated in FIG. 1, the EPS core network 100 includes the Mobility Management Entity (MME) 110, Packet Data Network Gateway (PGW) 125, and Serving Gateway (SGW) 120. MME 110 is connected to SGW 120 via the S1 interface, and the SGW 120 in turn is connected to PGW 125 via the S5 interface.

A common packet domain core network, such as EPS core network 100, can be used to provide core network functionality to the base station controller (BSC) 103 of the GSM/Edge radio access network (GERAN), the radio network controller (RNC) 102 of the UTRAN, and the eNodeB (eNB) 101 of the E-UTRAN.

MME 110 is considered the main control node for the core network 100. Some features handled by MME 110 include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information. Functions of the HLR/HSS 130 are related to mobility management, call and session establishment support, user authentication and access authorization.

SGW 120 is a data plane element within the core network 100. SGW 120 manages user plane (UP) mobility, acts as local mobility anchor and provides an UP interface to the radio access network(s). SGW 120 maintains the data path between the eNBs 101 and PGW 125. SGW 120 may also be in communication with home public land mobile network (HPLMN) PGW 135. PGW 125 provides connectivity for the UE to external packet data networks (PDNs). A UE 104 may have connectivity with more than one PGW 125 for accessing multiple PDNs 150.

A serving GPRS support node (SGSN) 105 may be provided in the core network 100 to transfer information to and from the GERAN and UTRAN via an Iu interface, for example. SGSN 105 communicates with SGW 120 via the S4 interface. SGSN 105 stores location information for a UE, such as routing area, and stores also user profiles, such as international mobile subscriber identity (IMSI).

$5^{th}$ generation wireless systems (5G) refers to the next generation (NG) of radio systems and network architecture. 5G is expected to provide higher bitrates and coverage than current LTE systems. 5G is also expected to increase network expandability up to hundreds of thousands of connections. The signal technology of 5G is anticipated to be improved for greater coverage as well as spectral and signaling efficiency. 5G will deliver extreme broadband and ultra-robust, low latency connectivity and massive networking to support the Internet of Things (IoT). With IoT devices and machine-to-machine (M2M) communication becoming more widespread, 5G networks will need to meet the needs of lower power, low data rate, and long battery life.

In order to provide the ultra-robust, low latency connectivity and massive networking for supporting IoT devices and machine-to-machine (M2M) communication, 5G will provide massive broadband that delivers gigabytes of bandwidth in uplink and downlink per second on demand, critical machine-type communication (MTC) that allows for the immediate (i.e., with extreme low e2e latency), synchronous feedback that enables, for example, remote control of robots and cars, and massive MTC that connects billions of sensors and machines.

One of the biggest differences between LTE (i.e., 4G) and 5G design requirements is the diversity of use-cases that 5G networks must support as compared to LTE networks that are primarily designed for the single use-case of delivering high speed mobile broadband. 5G will not only be a 'new RAT family' but its architecture will expand to multiple dimensions by providing a common core for multiple radio technologies (cellular, Wi-Fi, fixed), multiple services (IoT, mobile broadband, low latency-high reliability) and multiple network and service operators.

For 5G networks, a specific requirement was formulated by 3GPP in 3GPP TR 22.891 section 5.12.2, which states that a 5G system "shall support a secure mechanism that enables a device (e.g. IoT device) that has not been provided with a 3GPP subscription to establish access to a 3GPP network. The 3GPP network shall support a secure mechanism to remotely provide the device with a particular 3GPP subscription and other, third party provided, device configuration credentials when the device was not previously provided with a 3GPP subscription."

Currently, a cellular subscription is normally performed manually offline whereas a wi-fi subscription may be obtain online dynamically (automated or semi-automated) with a chosen mobile network operator. In this context, "manually" means that the user has to sign a contract (e.g., in a store) in order to receive a SIM card and PIN to obtain a subscription for use with any suitable cellular phone. Buying just a phone in a store or online does not complete a subscription (i.e., the user cannot use the phone to access cellular networks and offered services) as the user still needs to obtain the subscription and this process is performed "manually" and not currently automated for cellular subscriptions.

Increasingly, it would be desirable that UE/mobile stations/mobile devices do not require offline or manual activation/subscription. As outlined above, for future 5G networks, the subscription process should be automated. Certain embodiments of the invention provide a solution for at least this requirement.

One embodiment provides a mechanism for redirecting certain traffic from a UE at a network function (e.g., a 5G node B or access node or user plane function) to a destination/server that is different from the original destination provided by the UE. This new destination may, for example, be an announcement server, web server, or hypertext transfer protocol (HTTP) proxy. According to an embodiment, the new destination may provide an authorization process (using for example a user name and password, and/or means to subscribe for the requested service) and, once the UE is authorized and registered, the redirection would be stopped and the standard communication may start/continue, and direct the traffic to the destination as provided by the UE. In this manner, certain embodiments provide approaches for dynamic provisioning of subscriptions in 5G or LTE networks.

The dynamic provisioning of subscriptions may be beneficial for a number of reasons. For example, embodiments may enable use cases in which: (1) cellular subscribers can obtain "on the fly" subscription(s) without needing to go to a store to obtain new credentials, (2) cellular subscribers can obtain subscription for limited duration (e.g., 1 hour in a hotel or airport), (3) subscriptions can change on the fly allowing or prohibiting use of resources (e.g., cellular only, cellular+Wi-Fi, cellular+Wi-Fi+fixed access), (4) service providers can obtain subscription for numerous (e.g., many IoT) devices for both (1) and (2), (5) service based subscription access (e.g., eMBB, V2X, PubS, Smart Meters, voice, etc.) in combination with (1) and (2) and (3) or independent of these, or (6) cellular subscription and/or service based subscription expires in the middle of the session. Embodiments can also ensure that the user can continue to obtain regular services after obtaining the credentials and re-charging the account.

An embodiment provides a method of obtaining regular services after subscribing online for cellular access. Certain embodiments provide a mechanism to redirect certain traffic at a network function (e.g., 5G node B or access node or UPF) to a destination/server that is different from the original destination provided by the UE based on operator policies, such as the destination itself, subscription data, first/subsequent use of the network or an application, etc. This new destination may be an announcement server, Web server, HTTP proxy or any function/node as indicated by the operator. Some embodiments also provide a means for the network to stop the redirection and direct the traffic to the original destination as requested by the UE.

It is noted that, when a UE needs to obtain services by subscribing online, it is expected that the UE may or may not have 3GPP credentials and/or full authorization to use services offered by the MNO deploying the 3GPP network (e.g., where the user subscription has expired). In one embodiment, when the UE is trying to subscribe online and/or dynamically, the UE may be offered access to limited services (i.e., directed to a HTTP portal) for online subscription and the services provided by the online portal only (e.g., access to the service provider website and limited services available on that website). After subscription is successfully complete, the UE may be offered access to the subscribed services.

Figure 2:
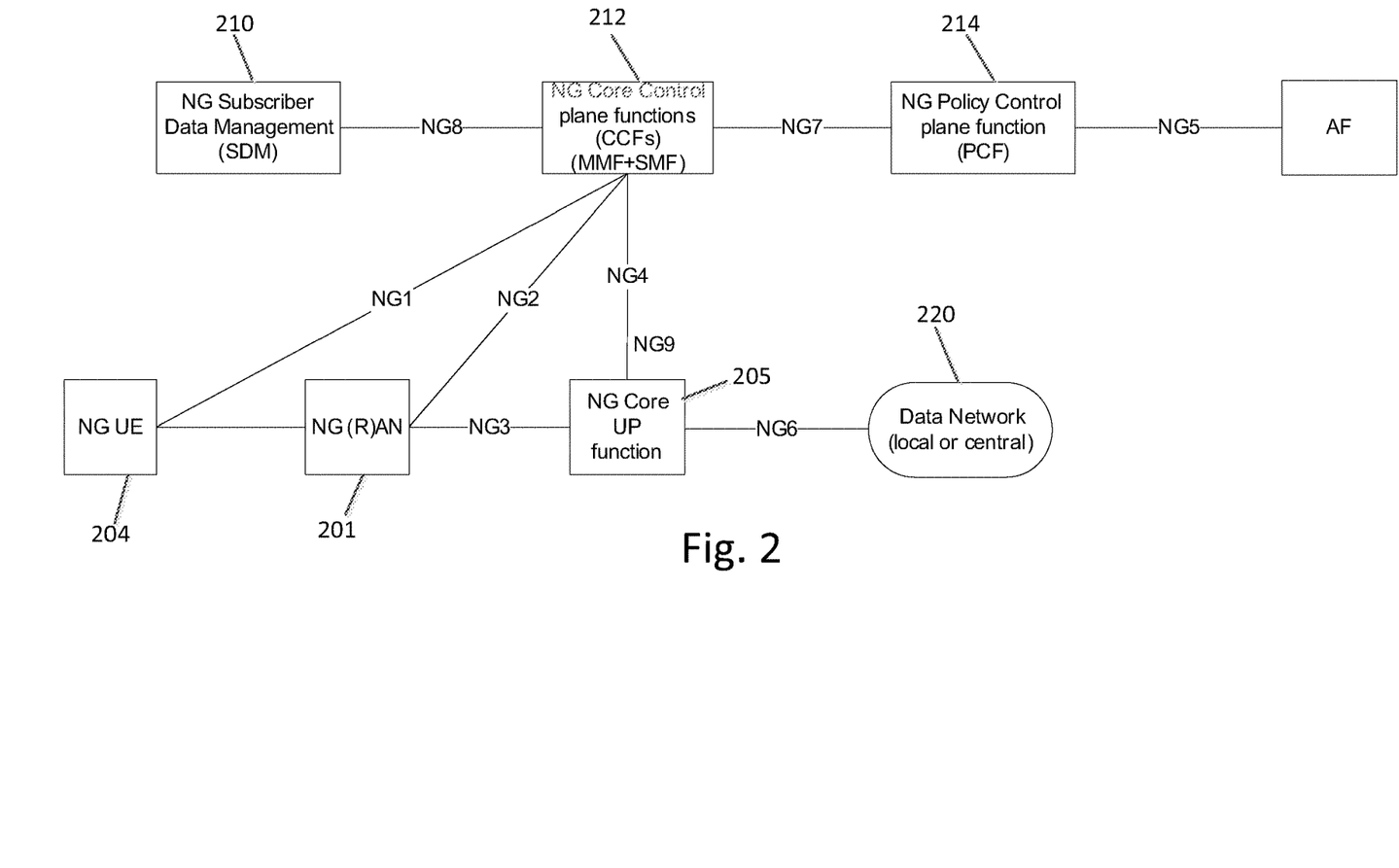
FIG. 2 illustrates an example of a system architecture, according to an embodiment.

FIG. 2 illustrates an example architecture for implementing one embodiment of the invention. As illustrated in FIG. 2, a system may include a next generation (NG) or 5G UE 204, an access node (NG AN) 201 (e.g., an eNB or 5G node B), a user plane node or function (UPF) 205, a core control plane node or function (CCF/SMF) 212, a policy control plane node or function (PCF) 214, a data network 220, and a subscriber data management node 210 that may include a subscription server.

One embodiment that may be implemented by the system of FIG. 2 includes a process for a UE to obtain a subscription and successfully register with a network. In this example, it is assumed that the UE does not have proper credentials or a subscription to register with the network. According to this embodiment, the UE 204 may initiate an attach request to register with the network (e.g., with the core control plane function (CCF/SMF) 212 in case of 5G or with the MME in case of LTE). The CCF may also be split into mobility management function (MMF), session management function (SMF) and authentication function (AUF). The attach request may include one or more identifiers, such as an international mobile subscriber identity (IMSI), international mobile equipment identity (IMEI), a user name/password, or any other unique identity that is stored/pre-configured on the UE 204 or entered by a user of the UE (e.g., previously obtained online or offline). If this is a first time request, then the UE may not provide any credentials or device (not user) authentication is based on credentials pre-configured on the device.

Upon receipt of the request from the UE 204, the network (e.g., CCF 212) processes the request to determine if the UE 204 has valid subscription data and/or known credentials and is authorized to obtain services. If the network determines that the UE 204 is not authorized to obtain services due to any reason (e.g., lack of authentication, subscription, enough credit on the account, etc.), then the network considers the UE 204 to be in "limited service state." As a result, the network may respond to the UE indicating that the attach request is "rejected with redirection" to indicate that the registration is rejected and the request is redirected for temporary access to limited services (e.g., redirection to http portal). According to an embodiment, the network (e.g., session management function within CCF or SMF) may also install routing policies in the 5G user plane function (UPF) 205 assigned for the UE 204 to indicate that traffic from the UE 204 should be redirected towards the packet data network (PDN) targeted for subscription or simply blocked as long as the UE 204 has no valid credentials. It is noted that redirection of packets on the application layer is usually only possible for certain applications, for example when the UE has initiated a http request. In one embodiment, when the UE 204 sends a packet destined for any destination on the network, the UPF 205 redirects the traffic to the PDN that provides access to the subscription server 210 by providing the corresponding destination IP address(es).

According to an embodiment, the network may register with the subscription server 210 for notification of the completion of successful subscription for regular services by the UE 204. In addition, the network may trigger the establishment of a special packet data connectivity session (PDU session) for the UE 204 or may install routing policies allowing temporary only access to the subscription server 210 via the PDU session originally requested (if a PDU session was requested). The established PDU session can be used, for example, to redirect any HTTP requests from the UE 204 to a HTTP portal that provides a user interface to access the subscription server 210 to create an "on the fly" subscription or to create a subscription entry for the user of the UE. In one embodiment, an "on the fly" subscription may refer to a subscription in which the subscription data is created or completed online during or after the device has accessed the network (and not beforehand by manual configuration).

The established PDU session can also be used by the subscription server 210 to send a (secured) push request to a special App (push service App) on the UE, to send a (secured) request to the UE's browser (if the browser is working as HTTP server), to send a SMS/chat or voice message or any other kind of (secured) message to provide a notification to the user of the UE 204 about redirection/blocking of the original attach request. Upon request by the subscription server 210, the user can provide authentication or subscription data, such as a username, password, credit card or bank account information via the PDU session, e.g., on a portal page or directly via an App or by any other means. This allows the subscription server 210 to create credentials, update credentials for the user in the HSS, and/or update credentials on the UE or (universal) subscriber identity module ((U)SIM) (or embedded SIM (eSIM)) card via a secure connection. The credentials created by the subscription server 210 can be used by the UE 204 for subsequent access requests. If the attach request is a first time request from the UE 204, the subscription process ensures that the UE 204 obtains the credentials for subsequent access to the network.

In an embodiment, when the subscription (performed at the application layer) is complete, the subscription server 210 may notify the network (e.g., the CCF/SMF 212). The subscription server 210 may also indicate the subscription duration for the UE 204, if it is a limited subscription (e.g., a session duration equal to 1 hour) so that the network can monitor the registration and the session accordingly. Upon notification from the subscription server 210, the network will no longer consider the UE to be in a "limited service" state anymore, and the network may respond to the UE 204 with a successful attach indication. If the UE 204 has originally requested a PDU session establishment, the network changes policies in the user plane so that the PDU session can be used from now on to access allowed packet data networks.

Another embodiment that may be implemented by the system of FIG. 2 includes a process for a UE to obtain subscription/access for a specific service. In this example, it is assumed that the UE has proper credentials and a subscription to register with the network, however the UE does not have a subscription to obtain specific services from the network. In this embodiment, the UE 204 may initiate a PDU session request to obtain a specific service for a certain access point name (APN). The network (e.g., CCF/SMF 212) processes the PDU session request to determine whether the UE 204 is authorized to use this APN. If it is determined that the UE 204 is not authorized for the APN, then the UE 204 may be redirected to the subscription server 210 (e.g., when the UE has sent a HTTP request). The network may then respond to the UE 204 indicating that the PDN connection is "rejected with redirection" due to lack of authorization for the given APN.

Additionally, the network may register with the subscription server 210 for notification of completion of successful subscription of the UE 204 for the specific services. The network may also trigger the establishment of a packet data connectivity (PDU session) for the UE 204. The PDU session may be used by the subscription server 210 to redirect the UE 204 to a HTTP portal that provides a user interface to access the subscription server 210 to create an "on the fly" subscription or to create a subscription entry for the user of the UE. The subscription server 210 may also provide a notification to the user, for example via a special App (push service) on the UE 204, the UE's browser, SMS, voice connection or any other means, about redirection of the request. The subscription server 210 may also request the user of the UE 204 to provide/update subscription information.

When the subscription (performed at the application layer) is complete, the subscription server 210 may notify the network. The subscription server 210 may also indicate the subscription duration for the UE 204, for example if it is a limited subscription (e.g., a session duration of 1 hour) so that the network can monitor the session accordingly. Upon notification from the subscription server 210, the network may trigger establishment of the session with the APN as requested by the UE 204 or the network may change policies in the user plane allowing the UE 204 to use the originally requested PDU session. Successful PDU session establishment allows the UE to obtain services for the requested APN.

Another embodiment that may be implemented by the system of FIG. 2 includes a process for a UE to extend a subscription mid-session. In this example, it is assumed that the UE 204 has proper credentials and a subscription to register with the network, and also has subscription to obtain specific services from the network when requested. However, in the middle of the session, the UE's LTE/5G subscription expires (i.e., the UE has a limited duration subscription) and/or access to specific service expires. So, the UE 204 is redirected to the subscription server 210 to extend the corresponding subscription.

In this embodiment, during an ongoing session, the network determines that the LTE/5G subscription/authorization for the UE 204 expires either for a certain session/service or for any session (i.e., the UE cannot remain registered in the network). If the UE 204 is not authorized to remain registered in the network, then the network may deregister the UE 204 and redirect the UE 204 towards a HTTP portal that provides access to the subscription server 210 to provide an opportunity to extend the registration. If the UE 204 is not authorized to obtain a specific service, the network may deactivate the corresponding PDU session (unauthorized APN) with a "redirection" indication, and may redirect the UE 204 towards a HTTP portal that provides access to the subscription server 210 to provide an opportunity to extend the specific session/service. Correspondingly, the network may install routing policies in a user plane function (e.g., 5G UPF 205) to indicate that traffic destined for the requested (unauthorized) APN or any APN from the UE 204 should be redirected towards the PDN targeted for subscription by providing the corresponding destination IP address(es). In one embodiment, if the UE 204 sends a packet destined for a certain destination, then it is redirected towards the PDN targeted for the subscription server 210. Alternatively, based on a trigger from the subscription server 210, the network can establish a new PDU session or use an existing PDU session to notify the UE 204 about session/authorization expiration and redirect the UE 204 to a portal server or any other suitable application server for obtaining a subscription online.

Also, the network may register with the subscription server 210 for notification of completion of successful subscription of the UE 204 for regular services. When the subscription (performed at the application layer) is complete, the subscription server 210 may notify the network. The subscription server 210 may also indicate the subscription duration, for example when it is a limited subscription (e.g., a session duration of 1 hour) so that the network can monitor the registration and session accordingly. Upon notification from the subscription server 210, the network can trigger establishment of the session with the APN requested by the UE 204. Successful PDU session establishment allows the UE 204 to obtain services for the requested APN.

Figure 3A:
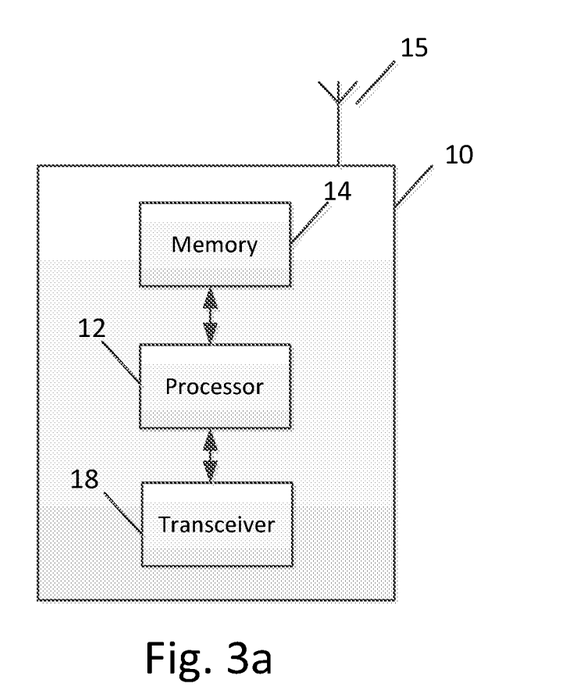
FIG. 3a illustrates a block diagram of an apparatus, according to one embodiment.

FIG. 3*a* illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, WLAN access point, mobility management entity (MME), or subscription server associated with a radio access network, such as a LTE network or 5G radio access technology. It should be noted that one of ordinary skill in the art would understand that apparatus 10 may include components or features not shown in FIG. 3*a*.

As illustrated in FIG. 3*a*, apparatus 10 may include a processor 12 for processing information and executing instructions or operations. Processor 12 may be any type of general or specific purpose processor. While a single processor 12 is shown in FIG. 3*a*, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or server, such as a node B, eNB, 5G NB or access point, for example. According to one embodiment, apparatus 10 may be a NG access node 201 or core network node 212, as illustrated in FIG. 2, or any combination thereof. In this embodiment, apparatus 10 may be controlled by memory 14 and processor 12 to receive a request from a user equipment (e.g., a IoT device or narrow band (NB)-IoT device). The request may be a request for the user equipment to register with the network or a request to obtain a specific service for a certain access point name. As such, the request may be an attach request or a packet data unit session request. According to certain embodiments, the request may further include an international mobile subscriber identity, international mobile equipment identity, username/password, and/or other unique identity information stored on the user equipment or provided by a user of the user equipment.

In an embodiment, after receiving the request from the user equipment, apparatus 10 may be controlled by memory 14 and processor 12 to determine whether the user equipment is authorized to obtain services from the network or is authorized to use the access point name. For example, apparatus 10 may be controlled to determine if the user equipment is authorized to obtain services or use the access point name by determining whether the user equipment has valid subscription data, known credentials, and/or is authorized to obtain services from the network.

When it is determined that the user equipment is not authorized to obtain services from the network or not authorized to use the access point name, apparatus 10 may be controlled by memory 14 and processor 12 to re-direct the user equipment to a subscription server, send a response to the user equipment indicating that the request is rejected with re-direction, and trigger establishment of a packet data connectivity session (e.g., PDU session) for the user equipment. Then, when a packet is received, from the user equipment, the packet being destined for any destination within the network, the packet is re-directed to the subscription server via the packet data connectivity session. In an embodiment, the packet is re-directed to the subscription server to create a subscription entry for the user. In one example, the packet is re-directed to the subscription server via the packet data connectivity session to create an "on the fly" subscription for the user.

According to an embodiment, apparatus 10 may be controlled by memory 14 and processor 12 to install routing policies in a user plane function assigned for the user equipment to indicate that traffic from the user equipment is to be re-directed towards a packet data network targeted for subscription or to indicate that traffic from the user equipment is to be blocked. In one embodiment, the packet data connectivity session is used to re-direct the user equipment to a hypertext transfer protocol (HTTP) portal that provides an interface to access the subscription server to create the "on the fly" subscription for the user equipment or to create a subscription entry for the user of the user equipment. In another embodiment, the packet data connectivity session is used by the subscription server to send a push request to a push service application on the user equipment to create the "on the fly" subscription for the user equipment or to create a subscription entry for the user of the user equipment.

In certain embodiments, apparatus 10 may be controlled by memory 14 and processor 12 to request, via the packet data connectivity session, subscription data from a user of the user equipment, and to create or update credentials for the user equipment using the subscription data. The credentials can then be used by the user equipment for subsequent requests to access the network.

According to some embodiments, apparatus 10 may be controlled by memory 14 and processor 12 to request a notification from the subscription server when the user equipment successfully completes a subscription for services from the network, and when the subscription is completed, to receive the notification from the subscription server. The notification may further include an indication of a duration of the subscription if it is a limited subscription. In an embodiment, upon the receiving of the notification that the subscription is complete, apparatus 10 may be controlled by memory 14 and processor 12 to change the policies in the user plane function so that the packet data connectivity session can be used by the user equipment to access allowed packet data networks, or to trigger establishment of a session with the access point name as requested by the user equipment. In addition, after being notified that the subscription for the user equipment is complete, apparatus 10 may be controlled by memory 14 and processor 12 to send a successful attach indication to the user equipment.

In certain embodiments, when the subscription of the user equipment expires during an ongoing session, apparatus 10 may be controlled by memory 14 and processor 12 to de-register the user equipment and to re-direct the user equipment to the subscription server to provide an opportunity to extend the subscription.

Figure 3B:
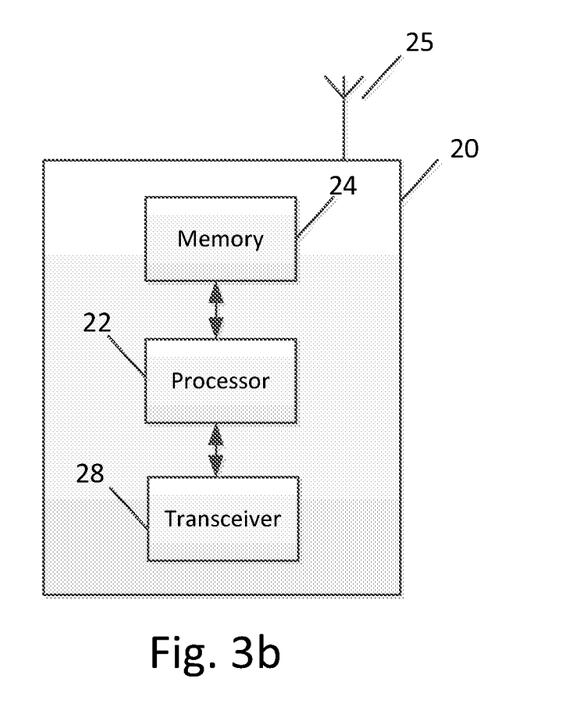
FIG. 3b illustrates a block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. Apparatus 20 may be implemented in, for example, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as LTE, LTE-A, 5G, WLAN, WiFi, Bluetooth, NFC, and any other radio access technologies. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. While a single processor 22 is shown in FIG. 3b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink or signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. In an embodiment, apparatus 20 may be NG UE 104 illustrated in FIG. 2 discussed above. According to certain embodiments, apparatus 20 may be controlled by memory 24 and processor 22 to perform the functions associated with embodiments described herein. In one embodiment, apparatus 20 may be controlled by memory 24 and processor 22 to transmit or initiate a request to a network (e.g., a 5G or LTE network). The request may be a request for the apparatus 20 to register with the network (e.g., with a CCF/SMF in 5G or with a MME for LTE) or a request to obtain a specific service for a certain access point name. As such, the request may be an attach request or a packet data unit session request. According to certain embodiments, the request may further include an international mobile subscriber identity, international mobile equipment identity, username/password, and/or other unique identity information stored on the apparatus 20 or provided by a user of the apparatus 20.

In one embodiment, apparatus 20 may be controlled by memory 24 and processor 22 to receive, from the network, an indication that the request has been rejected and that the apparatus 20 is being re-directed for temporary access to limited services. Subsequently, when apparatus 20 sends a packet that is destined for any destination within the network, the packet is re-directed to a subscription server, via a packet data connectivity session established for the apparatus 20. The subscription server provides a mechanism for the apparatus 20 to create a subscription entry for the user and/or to create an "on the fly" subscription in the network.

In one embodiment, the packet data connectivity session is used to re-direct the apparatus 20 to a hypertext transfer protocol (HTTP) portal that provides an interface to access the subscription server to create the "on the fly" subscription for the apparatus 20 or to create a subscription entry for the user of the apparatus 20. In another embodiment, the packet data connectivity session is used by the subscription server to send a push request to a push service application on the apparatus 20 to create the "on the fly" subscription for the apparatus 20 or to create a subscription entry for the user of the apparatus 20.

In certain embodiments, apparatus 20 may be controlled by memory 24 and processor 22 to receive a request, via the packet data connectivity session, for subscription data to be provided by the apparatus 20 or by a user of the apparatus 20, and to send the requested subscription data to the subscription server. The subscription data may be used by the network to create or update credentials for the user equipment. The credentials can then be used by the user equipment for subsequent requests to access the network. In an embodiment, when the subscription server successfully completes a subscription for the apparatus 20 to obtain services from the network, apparatus 20 may be controlled by memory 24 and processor 22 to receive a successful attach indication from the network so that the packet data connectivity session can be used by the apparatus 20 to access allowed packet data networks, and/or to receive authorization for a session with the access point name as requested by the apparatus 20.

Figure 4A:
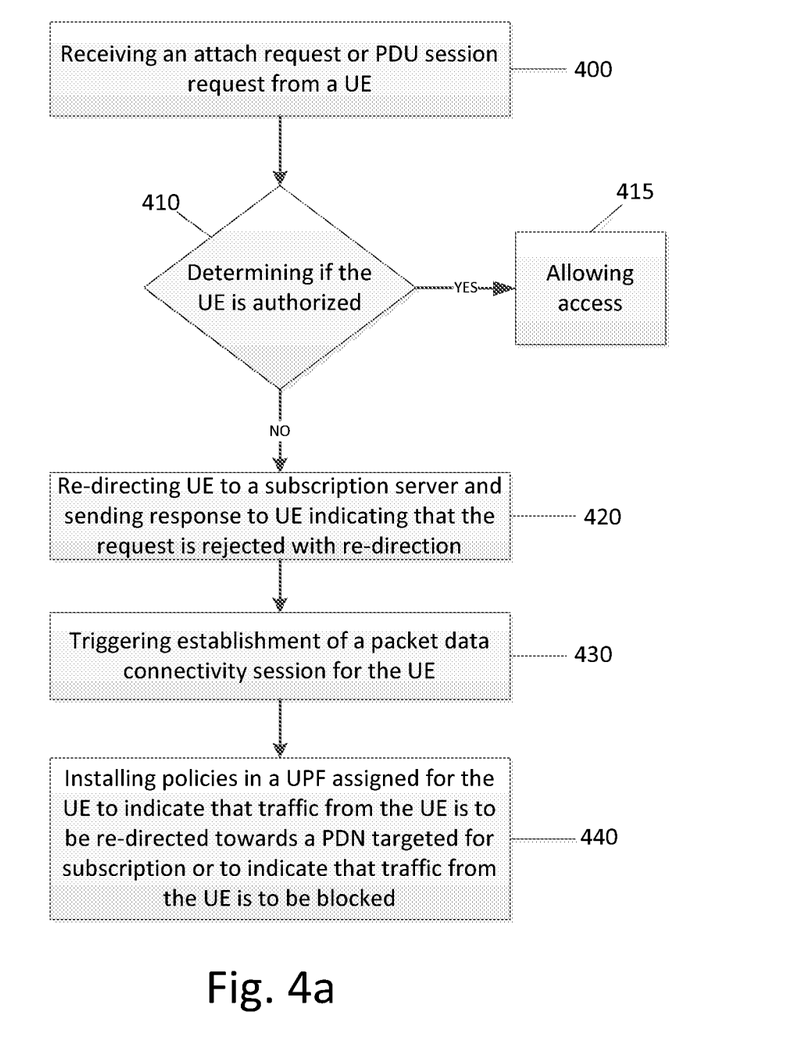
FIG. 4a illustrates a flow diagram of a method, according to one embodiment.

FIG. 4a illustrates a flow diagram of a method, according to one embodiment. In certain embodiments, the method of FIG. 4a may be performed by an access node or control node of a LTE or 5G communication system. For example, in some embodiments, the method of FIG. 4a may be performed by a control node or eNB. As illustrated in FIG. 4a, the method may include, at 400, receiving a request from a user equipment (e.g., an IoT device). The request may be a request for the user equipment to register with the network or a request to obtain a specific service for a certain access point name. As such, the request may be an attach request or a packet data unit session request. According to certain embodiments, the request may further include an international mobile subscriber identity, international mobile equipment identity, username/password, and/or other unique identity information stored on the user equipment or provided by a user of the user equipment.

In an embodiment, after receiving the request from the user equipment, the method may include, at 410, determining whether the user equipment is authorized to obtain services from the network or is authorized to use the access point name. For example, the determining of whether the user equipment is authorized to obtain services from the network or is authorized to use the access point name may include determining whether the user equipment has valid subscription data, known credentials, and/or is authorized to obtain services from the network.

When it is determined that the user equipment is authorized, then the method may include, at 415, allowing the user equipment to access the network. However, when it is determined that the user equipment is not authorized to obtain services from the network or not authorized to use the access point name, the method may include, at 420, re-directing the user equipment to a subscription server and sending a response to the user equipment indicating that the request is rejected with re-direction. The method may then include, at 430, triggering establishment of a packet data connectivity session (e.g., PDU session) for the user equipment. Then, when a packet is received, from the user equipment, which is destined for any destination within the network, the packet is re-directed to the subscription server via the packet data connectivity session. In an embodiment, the packet is re-directed to the subscription server to create a subscription entry for the user. In one example, the packet is re-directed to the subscription server via the packet data connectivity session to create an "on the fly" subscription for the user.

According to an embodiment, the method may also include, at 440, installing policies in a user plane function assigned for the user equipment to indicate that traffic from the user equipment is to be re-directed towards a packet data network targeted for subscription or to indicate that traffic from the user equipment is to be blocked. In one embodiment, the packet data connectivity session is used to re-direct the user equipment to a hypertext transfer protocol (HTTP) portal that provides an interface to access the subscription server to create the "on the fly" subscription for the user equipment or to create a subscription entry for the user of the UE. In another embodiment, the packet data connectivity session is used by the subscription server to send a push request to a push service application on the user equipment to create the "on the fly" subscription for the user equipment or to create a subscription entry for the user of the UE.

In certain embodiments, the method may also include requesting, via the packet data connectivity session, subscription data from a user of the user equipment, and to create or update credentials for the user equipment using the subscription data. The credentials can then be used by the user equipment for subsequent requests to access the network.

According to some embodiments, the method may also include requesting a notification from the subscription server when the user equipment successfully completes a subscription for services from the network, and when the subscription is completed, receiving the notification from the subscription server. The notification may further include an indication of a duration of the subscription if it is a limited subscription. In an embodiment, upon the receiving of the notification that the subscription is complete, the method may include changing the policies in the user plane function so that the packet data connectivity session can be used by the user equipment to access allowed packet data networks, or to trigger establishment of a session with the access point name as requested by the user equipment.

In certain embodiments, when the subscription of the user equipment expires during an ongoing session, the method may include de-registering the user equipment and re-directing the user equipment to the subscription server to provide an opportunity to extend the subscription.

Figure 4B:
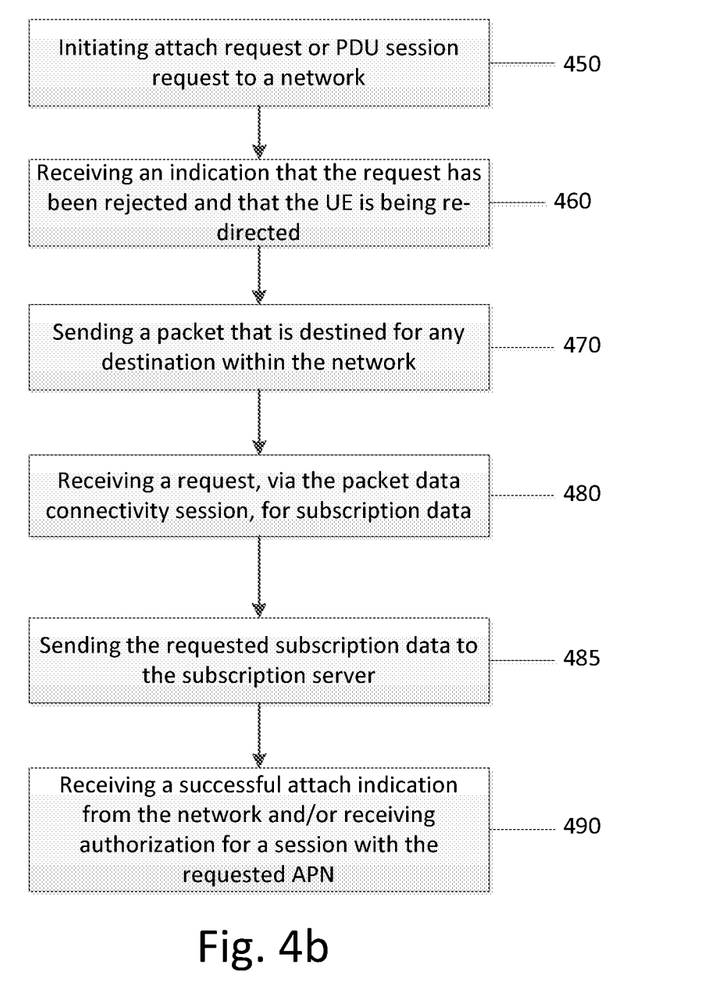
FIG. 4b illustrates a flow diagram of a method, according to another embodiment.

FIG. 4b illustrates a flow diagram of a method, according to another embodiment. In certain embodiments, the method of FIG. 4b may be performed by a UE, mobile device, mobile station, IoT device or NB-IoT device, for example. As illustrated in FIG. 4b, the method may include, at 450, transmitting or initiating, by a UE, a request to a network (e.g., a 5G or LTE network). The request may be a request for the UE to register with the network (e.g., with a CCF/SMF in 5G or with a MME for LTE) or a request to obtain a specific service for a certain access point name. As such, the request may be an attach request or a packet data unit session request. According to certain embodiments, the request may further include an international mobile subscriber identity, international mobile equipment identity, username/password, and/or other unique identity information stored on the UE or provided by a user of the UE.

In one embodiment, the method may then include, at 460, receiving, from the network, an indication that the request has been rejected and that the UE is being re-directed for temporary access to limited services. Subsequently, the method may include, at 470, sending a packet that is destined for any destination within the network. The packet is re-directed to a subscription server, via a packet data connectivity session established for the UE. The subscription server provides a mechanism for the UE to create a subscription entry for the user and/or to create an "on the fly" subscription in the network.

In one embodiment, the packet data connectivity session is used to re-direct the UE to a hypertext transfer protocol (HTTP) portal that provides an interface to access the subscription server to create the "on the fly" subscription for the UE. In another embodiment, the packet data connectivity session is used by the subscription server to send a push request to a push service application on the UE to create the "on the fly" subscription for the UE.

In certain embodiments, the method may also include, at 480, receiving a request, via the packet data connectivity session, for subscription data to be provided by the UE or a user of the UE, for example. At 485, the method may include sending the requested subscription data to the subscription server. The subscription data may be used by the network to create or update credentials for the UE. The credentials can then be used by the UE for subsequent requests to access the network. In an embodiment, when the subscription server successfully completes a subscription for the UE to obtain services from the network, the method may include, at 490, receiving a successful attach indication from the network so that the packet data connectivity session can be used by the UE to access allowed packet data networks, and/or receiving authorization for a session with the access point name as requested by the UE in the PDU session request.

It is noted that one distinction between certain embodiments of the invention and conventional methods (such as the authentication process for public WLANs or Wi-Fi where a device is directed to specific log-in sites) is that the redirection is triggered on the network side. In other words, authentication for Wi-Fi does not have the automatic redirection functionality when some applications are opened on the device; rather, the redirection in Wi-Fi must always be initiated through the web browser. In contrast, according to an embodiment of the invention, all traffic may be redirected to the new destination server.

Embodiments of the invention provide several technical improvements and/or advantages. For example, as a result of embodiments, a user can obtain and/or extend cellular subscription dynamically while trying to obtain service (i.e. typing a certain http address in the browser and/or opening an application that requires wireless connectivity) without having to physically go to a store or manually initiating an action to subscribe online. Also, as a result of embodiments, the operator can support automated subscription without any need for manual entry in HSS or backend servers. Furthermore, a service provider can obtain subscription for numerous devices dynamically and at the same time. As such, embodiments of the invention can improve performance and throughput of network nodes including, for example, eNBs and UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving, by a control node in a network, a request from a user equipment, wherein the request comprises a request for the user equipment to register with the network or a request to obtain a specific service for a certain access point name;
determining whether the user equipment is authorized to obtain services from the network or authorized to use the access point name; and
when it is determined that the user equipment is not authorized to obtain services from the network or not authorized to use the access point name:
sending a response to the user equipment indicating that the request is rejected with re-direction; and
triggering establishment of a packet data connectivity session for the user equipment, wherein when a packet is received, from the user equipment, that is destined for any destination within the network, the packet is re-directed to the subscription server via the packet data connectivity session to create a user subscription;
wherein the packet data connectivity session is used to re-direct the user equipment to a hypertext transfer protocol (HTTP) portal that provides an interface to access the subscription server to create a subscription entry for the user, or wherein the packet data connectivity session is used by the subscription server to send a push request to a push service application on the user equipment to create the subscription entry for the user.

2. The method according to claim 1, wherein the request comprises one of an attach request or a packet data unit session request.

3. The method according to claim 1, wherein the determining comprises determining whether the user equipment has valid subscription data, known credentials, and/or is authorized to obtain services from the network.

4. The method according to claim 1, wherein the request comprises at least one of an international mobile subscriber identity, international mobile equipment identity, username/password, or other unique identity information stored on the user equipment or provided by a user of the user equipment.

5. The method according to claim 1, further comprising installing policies in a user plane function assigned for the user equipment to indicate that traffic from the user equipment is to be re-directed towards a packet data network targeted for subscription or to indicate that traffic from the user equipment is to be blocked.

6. The method according to claim 1, further comprising:
requesting, via the packet data connectivity session, subscription data from a user of the user equipment; and
creating or updating credentials for the user equipment using the subscription data, wherein the credentials are used by the user equipment for subsequent requests to access the network.

7. The method according to claim 1, further comprising:
requesting a notification from the subscription server when the user equipment successfully completes subscription creation or update for services from the network; and
when the subscription is completed, receiving the notification from the subscription server,
wherein the notification further comprises an indication of a duration of the subscription if it is a limited subscription.

8. The method according to claim 7, wherein, upon the receiving of the notification that the subscription is complete, the method further comprises:
changing the policies in the user plane function so that the packet data connectivity session can be used by the user equipment to access allowed packet data networks; or
triggering establishment of a session with the access point name as requested by the user equipment.

9. The method according to claim 1, wherein, when the subscription of the user equipment expires during an ongoing session, the method further comprises:
de-registering the user equipment; and
re-directing the user equipment to the subscription server to provide an opportunity to extend the subscription.

10. The method according to claim 1, wherein the network comprises a 5G network.

11. A computer program embodied on a non-transitory computer readable medium, the computer program configured to control a processor to perform a method according to claim 1.

12. An apparatus, comprising:
at least one processor; and
at least one memory including computer program code,
wherein the at least one memory and computer program code are configured, with the at least one processor, to cause the apparatus at least to
receive a request from a user equipment, wherein the request comprises a request for the user equipment to register with a network or a request to obtain a specific service for a certain access point name;
determine whether the user equipment is authorized to obtain services from the network or authorized to use the access point name; and
when it is determined that the user equipment is not authorized to obtain services from the network or not authorized to use the access point name;
send a response to the user equipment indicating that the request is rejected with re-direction; and
trigger establishment of a packet data connectivity session for the user equipment, wherein when a packet is received, from the user equipment, that is destined for any destination within the network, the packet is re-directed to the subscription server via the packet data connectivity session to create a user subscription;
wherein the packet data connectivity session is used to re-direct the user equipment to a hypertext transfer protocol (HTTP) portal that provides an interface to access the subscription server to create a subscription entry for the user, or wherein the packet data connectivity session is used by the subscription server to send a push request to a push service application on the user equipment to create the subscription entry for the user.

13. The apparatus according to claim 12, wherein the request comprises one of an attach request or a packet data unit session request.

14. The apparatus according to claim 12, wherein the determining comprises determining whether the user equipment has valid subscription data, known credentials, and/or is authorized to obtain services from the network.

15. The apparatus according to claim 12, wherein the request comprises at least one of an international mobile subscriber identity, international mobile equipment identity, username/password, or other unique identity information stored on the user equipment or provided by a user of the user equipment.

16. The apparatus according to claim 12, wherein the at least one memory and computer program code are further configured, with the at least one processor, to cause the apparatus at least to:
install policies in a user plane function assigned for the user equipment to indicate that traffic from the user equipment is to be re-directed towards a packet data network targeted for subscription or to indicate that traffic from the user equipment is to be blocked.

17. The apparatus according to claim 12, wherein the at least one memory and computer program code are further configured, with the at least one processor, to cause the apparatus at least to:
request, via the packet data connectivity session, subscription data from a user of the user equipment; and
create or update credentials for the user equipment using the subscription data, wherein the credentials are used by the user equipment for subsequent requests to access the network.

18. The apparatus according to claim 12, wherein the at least one memory and computer program code are further configured, with the at least one processor, to cause the apparatus at least to:
request a notification from the subscription server when the user equipment successfully completes subscription creation or update for services from the network; and
when the subscription is completed, receive the notification from the subscription server,
wherein the notification further comprises an indication of a duration of the subscription if it is a limited subscription.

19. The apparatus according to claim 18, wherein, upon the receiving of the notification that the subscription is complete, the at least one memory and computer program code are further configured, with the at least one processor, to cause the apparatus at least to:
change the policies in the user plane function so that the packet data connectivity session can be used by the user equipment to access allowed packet data networks; or
trigger establishment of a session with the access point name as requested by the user equipment.

20. The apparatus according to claim 12, wherein the at least one memory and computer program code are further configured, with the at least one processor, to cause the apparatus at least to:
de-register the user equipment; and
re-direct the user equipment to the subscription server to provide an opportunity to extend the subscription.

* * * * *